Figure 1:
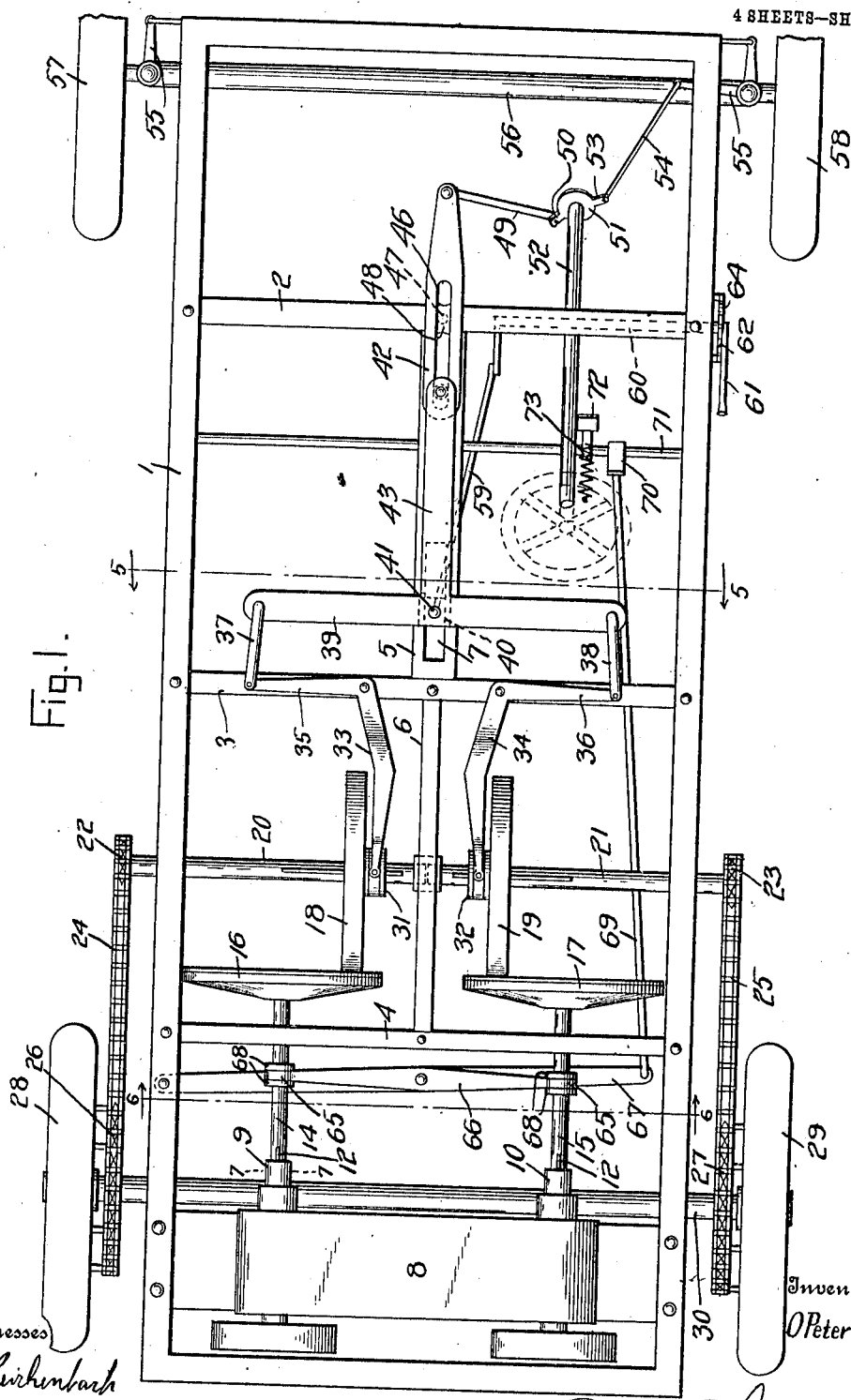

O. P. GRAU.
FRICTION DRIVE MECHANISM.
APPLICATION FILED JULY 22, 1908.

956,958.

Patented May 3, 1910.
4 SHEETS—SHEET 1.

Witnesses
O. K. Reichenbach
H. C. McCartney

Inventor
O Peter Grau

By
Attorneys.

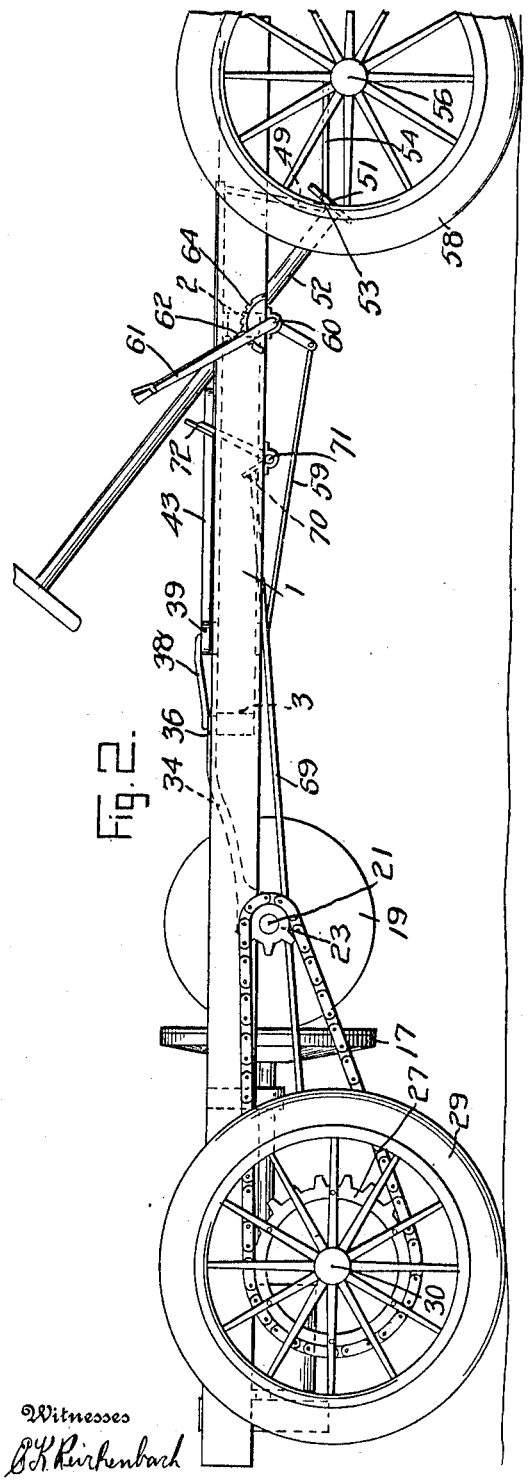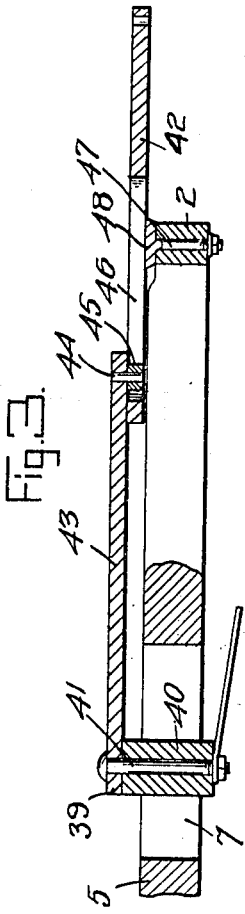

O. P. GRAU.
FRICTION DRIVE MECHANISM.
APPLICATION FILED JULY 22, 1908.
956,958.
Patented May 3, 1910.
4 SHEETS—SHEET 3.
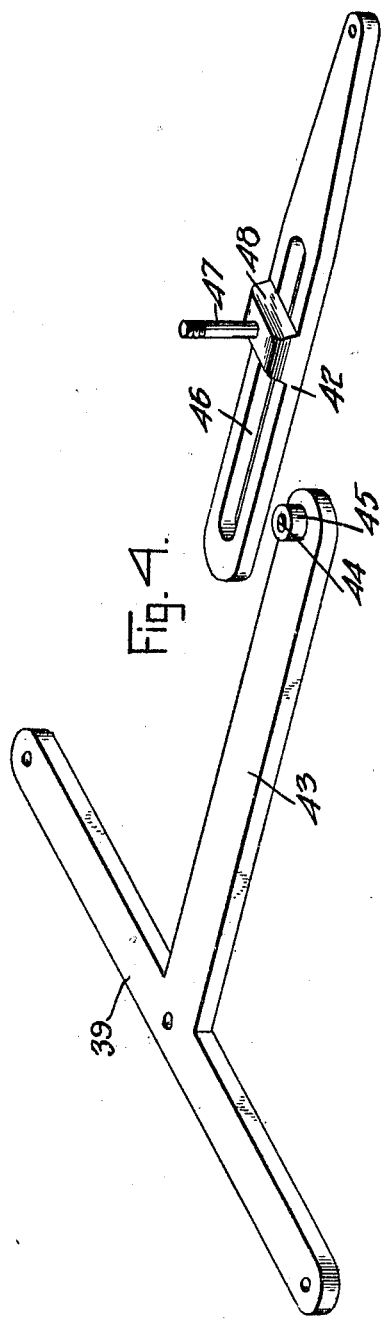
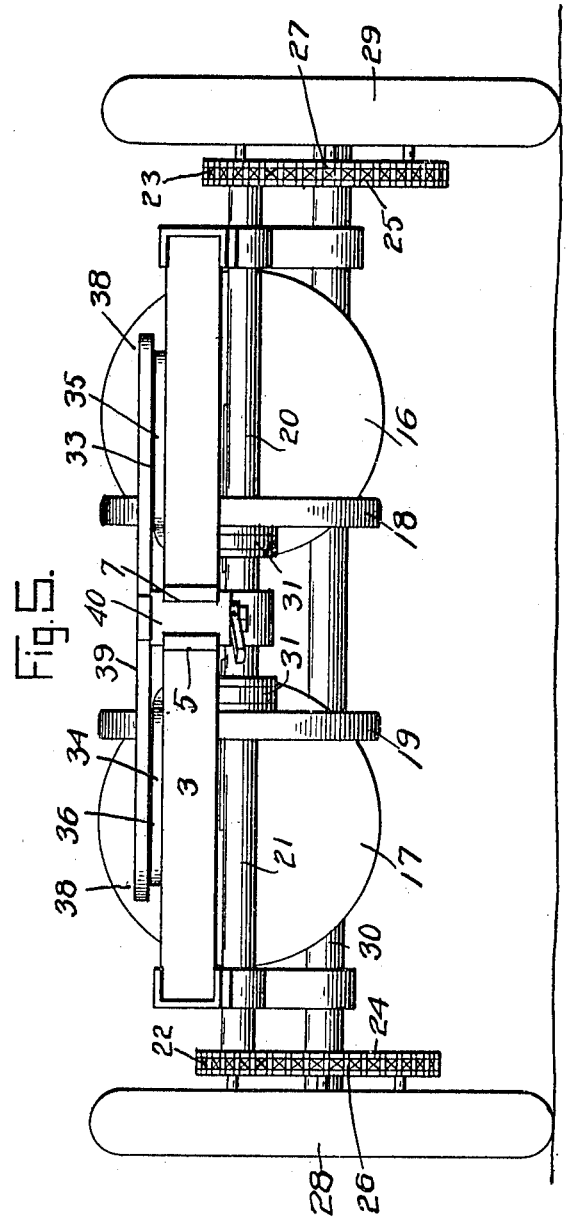
Witnesses
E. K. Reichenbach
N. C. McEntway
Inventor
O Peter Grau
By Chandler & Chandler
Attorneys

O. P. GRAU.
FRICTION DRIVE MECHANISM.
APPLICATION FILED JULY 22, 1908.
956,958.
Patented May 3, 1910.
4 SHEETS—SHEET 4.
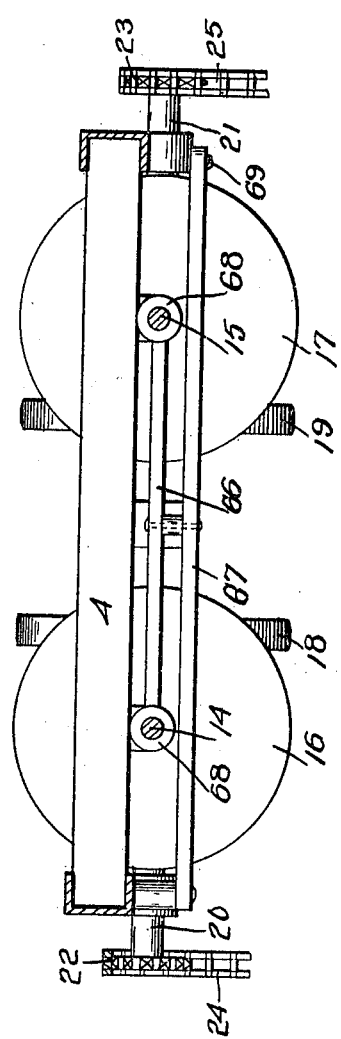
Witnesses
E. K. Reichenbach
N. C. McCartney
Inventor
O Peter Grau
By
Attorneys

UNITED STATES PATENT OFFICE.

O PETER GRAU, OF LONG GREEN, MARYLAND, ASSIGNOR OF ONE-HALF TO HENRY WALTER GRAU, OF LONG GREEN, MARYLAND.

FRICTION DRIVE MECHANISM.

956,958.  Specification of Letters Patent.  Patented May 3, 1910.

Application filed July 22, 1908. Serial No. 444,798.

*To all whom it may concern:*

Be it known that I, O. PETER GRAU, a citizen of the United States, residing at Long Green, in the county of Baltimore, State of Maryland, have invented certain new and useful Improvements in Friction Drive Mechanism for Motor-Cars; and I do hereby declare the following to be a full, clear, and exact description of the invention, such as will enable others skilled in the art to which it appertains to make and use the same.

The present invention relates to improvements in friction drive mechanisms for motor cars, and it has for its particular object the provision of an exceedingly simple, readily operated, and efficient mechanism of that class including a pair of friction pulleys which are simultaneously shifted toward or from as well as past the centers of a pair of friction disks carried by a pair of drive shafts operatively connected with and rotated in opposite directions by the engine, whereby the various movements of the pulleys with respect to the disks will correspondingly change the speed at which the car is driven and will also reverse the direction of travel.

The invention further aims to provide a power transmission mechanism of the above specified type in which the pulleys are capable not only of simultaneous movement toward and from the centers of the adjacent disks, as above described, but are also designed for opposite action, *i. e.*, one pulley moving toward and the other from the centers of the disks, thus driving one of the rear or traction wheels slower than the other, and, in consequence, obviating the necessity for the use of a differential gear or gears.

To effect the various movements of the pulleys, they are connected by means of a pair of angle levers with a two-part crosshead, each member of which is operatively connected with a separate lever, the invention residing especially in the particular construction of the cross-head and in the particular manner in which the same is connected with the operating levers and with the pulleys.

The preferred embodiment of the invention is illustrated in the accompanying drawings in which corresponding parts or features, as the case may be, are designated by the same reference numerals throughout the several views.

Of the said drawings, Figure 1 is a plan view of the frame of a motor car equipped with the improved friction drive mechanism. Fig. 2 is a side elevation thereof. Fig. 3 is a fragmental longitudinal section. Fig. 4 is an inverted perspective view of the cross-head, the sections thereof being shown as detached from each other. Figs. 5, 6 and 7 are transverse sections taken on the lines 5—5, 6—6, and 7—7 of Fig. 1. Fig. 8 is an enlarged fragmental detail view illustrating the bearing in which the inner ends of the pulley shafts are journaled.

Referring more particularly to the drawings, 1 designates generally, the frame of the car, the side beams of which are connected together by front, central and rear cross-beams 2, 3 and 4 disposed between the ends of the frame, the beams 2 and 3 being connected together by a longitudinal beam 5, and the beams 3 and 4 by a longitudinal beam 6, the first-mentioned longitudinal beam having a slot 7 formed therein adjacent its rear end.

The motor 8 which is of the opposed type, is mounted upon a platform located at the rear end of the frame and is provided with a pair of short tubular shafts 9 and 10 in which are fitted the rear ends of a pair of parallel shafts 14 and 15, arranged in spaced relation to each other and disposed longitudinally of the frame, the forward portions of said shafts fitting in bearings carried by the cross-beams 4. The bores of the shafts 9 and 10 are provided with longitudinal key seats 11 which receive the keys 12 carried by the shafts 14 and 15, this arrangement permitting a slight endwise movement of the latter shafts, as hereinafter described. The extreme front ends of the shafts 14 and 15 are provided with friction disks 16 and 17 which are rigidly secured thereto and are disposed in frictional contact with a pair of pulleys 18 and 19 keyed for sliding movement upon a pair of transversely-disposed shafts 20 and 21 whose mutually-adjacent inner ends fit in alining openings formed in a bearing carried by the beam 6. The shafts 20 and 21 are supported intermediate their ends in brackets carried by the side beams of the frame and are provided at their outer ends with sprockets 22 and 23 connected by chains 24 and 25 with sprockets 26 and 27 secured to the hubs of the traction wheels 28 and 29 revolubly mounted upon the ends of the rear axle 30.

The pulleys 18 and 19 are provided respectively with inwardly-extending hubs 31 and 32 which are pivotally connected with the yoked rear ends of the arms 33 and 34 of a pair of angle levers pivoted at their apexes to the central cross-beam 3, the arms 35 and 36 of said levers having their free ends connected by links 37 and 38 with the adjacent ends of a cross head 39 which is mounted upon the beam 5 and is provided with a depending block 40 to which it is pivotally connected as indicated by the numeral 41, said block being located intermediate the ends of the cross-head and having its lower portion extending into the slot 7 above referred to.

The cross head includes a forwardly-projecting stem comprising a front section 42 and a rear section 43 which latter is formed integral with the cross-head and is provided at its forward end with a depending pin 44 upon which a roller 45 is revolubly mounted, the pin and roller extending into the longitudinal slot 46 formed in the front stem section 42, the last-mentioned section being pivotally connected intermediate its ends with the front cross beam 2 by means of a depending pin 47 carried by a transversely-disposed strap 48 secured at its ends to said section, said pin fitting in an opening formed centrally of the beam 2.

Owing to the particular mounting of the stem sections, and to the particular devices employed for connecting the same with each other, it will be apparent that they form in effect a toggle joint, which latter is broken by means of a link 49 connected at one end to the forward end of the section 42, and at the other end to an arm 50 secured to a disk 51, which is in turn, attached to the lower end of the steering rod 52, the disk 51 being provided with a second arm 53 which is connected by a link 54 with the adjacent knuckle 55 of the front axle 56, the knuckles carrying the front wheels 57 and 58.

The block 40 above referred to is in like manner connected by a link 59 with a rock shaft 60 disposed longitudinally of the front beam 2 and actuated by a lever 61 provided with a spring pressed dog 62 arranged for engagement with the teeth of a rack 64 secured to the adjacent side beam of the frame.

Owing to the connection between the rock shaft and the block 40 which latter is carried by the body of the cross head or the cross head proper, and to the engagement of said block in the slot 7, it will be apparent that when the rock shaft is swung in one direction, the block will move toward the front end of said slot, thus forcing the cross head forwardly of the frame, such movement being permitted by the pin and slot connection between the two sections of the stem of the cross head. During the above described movement, the angle levers will be rocked upon their pivots, the arms 33 and 34 thereof swinging outwardly and thus moving the friction pulleys 18 and 19 toward the centers of the disks 16 and 17, whereupon the speed at which the shafts 20 and 21 rotate, and in consequence, the speed at which the car is traveling will gradually decrease. When the rock shaft is turned in the opposite direction, the cross head will move rearwardly of the frame, thus effecting a simultaneous movement of the pulleys toward the peripheries of the disks, with a resultant increase in the speed at which the pulley shafts are driven. Movement of the pulleys past the centers of the disks will effect a rotation of the pulley shafts in the opposite direction, or in other words, will reverse the direction of travel of the car.

The connection between the steering mechanism and the front section of the stem of the cross head permits the joint between the sections of the cross head to be broken when the car is traveling around a curve, the rotation of the steering rod in either direction angling said sections owing to the pin and slot connection therebetween, and to the pivotal connection between the cross head and the block 40. When, therefore, said sections are angled, the two angle levers will be swung in opposite directions upon their pivots, the arm 33 of one lever swinging outwardly, and the corresponding arm 34 of the other lever swinging inwardly, whereupon the speed at which the driven shaft 20 is rotated will gradually decrease as the pulley 18 moves toward the center of the disk 16, while the speed of the shaft 21 will proportionately increase as the pulley 19 approaches the periphery of the disk 17. By reason of this construction, it will be obvious that the necessity for the employment of a differential gear or gears is obviated, since one of the driven shafts, and in consequence, the corresponding rear traction wheel may thus be caused to rotate either faster or slower than the other driven shaft and the traction wheel adjacent to the same. It will be seen, therefore, that the cross head is susceptible of two separate movements in either direction, i. e., a bodily movement backward and forward, due to the actuation of the rock shaft, and a swinging movement upon its pivot, effected by the steering mechanism. In the first instance, both pulleys are simultaneously moved toward or from the centers of the adjacent disks, and both pulley shafts rotate at the same speed, while in the second instance, one pulley moves toward the center of one disk and the other pulley away from the center of the other disk, the shaft of the first pulley being driven at a gradually decreasing speed, while the speed of the second pulley shaft gradually increases.

The invention further contemplates the provision of means for effecting a simultaneous backward or forward movement of the shafts 14 and 15, to which the disks 16 and 17 are secured, the movement of said disks into and out of frictional engagement with the pulleys 18 and 19 serving to immediately start or stop the movement of the car, as will be understood. To this end, both shafts have their forward ends projecting through eyes 65 formed at the ends of a transversely-disposed lever 66 which rests upon and is pivoted centrally to a similarly - disposed lever 67 pivoted at its left hand end to the adjacent side beam of the car frame 1, said shafts being provided centrally with pairs of spaced collars 68 between which the eyes 65 fit. At its right-hand end, the lever 67 is pivotally connected to the rear end of a pitman 69 whose front end is connected, in turn, to a strap 70 secured to a transversely-disposed rock-shaft 71 journaled at opposite ends in bearings carried by the side beams above mentioned. The actuation of the rock shaft is effected by means of a pedal 72 which projects upwardly through an opening formed in the floor of the car, said pedal being connected with a coil-spring 73, whose tension normally retains the pedal at the limit of its rearward movement, the shafts 14 and 15 being thus retracted and the disks carried thereby released from engagement with the friction pulleys. When, however, the pedal is forced forward against the action of the spring, the shafts will be moved correspondingly, and the disks brought into contact with said pulleys, whereupon the rotation of the rear axle will commence, owing to its connection with the shafts 20 and 21 upon which the pulleys are keyed.

Further description of the invention as a whole, and of its operation is deemed unnecessary in view of the foregoing, it being understood that modifications and changes may be made within the scope of the appended claims, since it is not intended that the invention be limited strictly to the details of construction shown and described.

In the claims, the term "driving shafts" is used with reference to the shafts 14 and 15 which are driven by the engine and carry the driving friction elements 16 and 17 while the shafts 20 and 21 which carry the sliding friction elements 18 and 19 which contact with and are driven by the first-mentioned friction elements are termed the "driven" shafts.

What is claimed is:

1. The combination, with a pair of parallel driving shafts, and a friction disk secured to one end of each shaft, of a pair of driven shafts disposed at right angles to the driving shafts; a friction pulley slidable upon each driven shaft and arranged in contact with the adjacent disk; a movable member operatively connected with said pulleys; and separate actuating devices connected with said member for simultaneously shifting both pulleys toward or from the centers of the adjacent disks, to vary the speed of rotation of said driven shafts, and for simultaneously shifting either pulley toward and the other pulley from the centers of the adjacent disks, to cause one of the driven shafts to rotate at a higher rate of speed than the other.

2. The combination, with a frame, a pair of parallel driving shafts carried thereby and a friction disk secured to one end of each shaft, of a pair of alining driven shafts carried by the frame and disposed at right angles to said driving shafts; a friction pulley slidable upon each driven shaft and arranged in contact with the adjacent disk; a member carried by the frame and connected at its opposite ends with said pulleys; and means for moving said member forward or backward, to simultaneously shift both pulleys toward or from the centers of the adjacent disks, to vary the speed of rotation of said driven shafts.

3. The combination, with a frame, a pair of parallel driving shafts carried thereby, and a friction disk secured to one end of each shaft, of a pair of alining driven shafts carried by the frame and disposed at right angles to the driving shafts; a friction pulley slidable upon each driven shaft and arranged in contact with the adjacent disk; a rocking member carried by the frame and connected at opposite ends with the adjacent pulleys; means for moving said member bodily backward or forward, for simultaneously shifting both pulleys toward or from the centers of the adjacent disks; and separate means for rocking said member in either direction, to simultaneously shift either pulley toward and the other pulley from the centers of said disks, to cause one of the driven shafts to rotate at a higher rate of speed than the other.

4. The combination, with a frame, a pair of parallel driving shafts carried thereby, and a friction disk secured to one end of each shaft, of a pair of alining driven shafts carried by the frame and disposed at right angles to the driving shafts; a friction pulley slidable upon each driven shaft and arranged in contact with the adjacent disk; a rocking member carried by the frame; a pair of angle levers interposed between said member and the driven shafts, each angle lever having one arm thereof connected with the adjacent end of said member, and the other arm connected with the adjacent pulley; and means for moving said member bodily forward or backward, to simultaneously shift both pulleys toward or from the centers of the adjacent disks.

5. The combination, with a frame, a pair of parallel driving shafts carried thereby, and a friction disk secured to one end of each shaft, of a pair of alining driven shafts carried by the frame and disposed at right angles to the driving shafts; a friction pulley slidable upon each driven shaft and arranged in contact with the adjacent disk; a rocking member carried by the frame; a pair of angle levers interposed between said member and said driven shafts, each angle lever having one arm thereof connected with the adjacent end of said member, and the other arm with the adjacent pulley; means for bodily moving said member forward or backward, to simultaneously shift both pulleys toward or from the centers of said disks; and separate means for rocking said member, to simultaneously shift either pulley toward and the other pulley from the centers of said disks.

6. The combination, with a frame, a pair of parallel driving shafts carried thereby, and a friction disk secured to one end of each shaft, of a pair of alining driven shafts carried by the frame and disposed at right angles to the driving shafts; a friction pulley slidable upon each driven shaft and arranged in contact with the adjacent disk; a cross head carried by the frame and connected at its ends with said pulleys, said cross head including a jointed stem; and means for breaking the joint between the sections of said stem, to rock the cross head and simultaneously shift either pulley toward and the other pulley from the centers of said disks, to cause one of the driven shafts to rotate at a higher rate of speed than the other.

7. The combination, with a frame, a pair of parallel driving shafts carried thereby, and a friction disk secured to one end of each shaft, of a pair of alining driven shafts disposed at right angles to the driving shafts; a friction pulley slidable upon each driven shaft and arranged in contact with the adjacent disk; a cross head connected at its ends with said pulleys, said cross head including a jointed stem; and means for moving the body portion of the cross head backward or forward, to simultaneously shift both pulleys toward or from the centers of said disks.

8. The combination, with a frame, a pair of parallel driving shafts carried thereby, and a friction disk secured to one end of each shaft, of a pair of alining driven shafts carried by the frame and disposed at right angles to the driven shafts, a friction pulley slidable upon each driven shaft and arranged in contact with the adjacent disk; a cross head connected at its ends with said pulleys, said cross head being carried by the frame and being provided with a forwardly-extending jointed stem having one section thereof pivotally connected to the frame; and means connected with said section for swinging the same upon its pivot, to break the joint between said sections, to rock the body of the cross head and simultaneously shift either pulley toward and the other pulley from the centers of the adjacent disks.

9. The combination, with a frame, a pair of parallel driving shafts carried thereby, and a friction disk secured to one end of each shaft, of a pair of alining driven shafts carried by the frame and disposed at right angles to the driving shafts; a friction pulley slidable upon each driven shaft and arranged in contact with the adjacent disk; a cross head carried by the frame and connected at its ends with the adjacent pulleys, said cross head being provided with a jointed stem having one section thereof pivoted to the frame and provided with a slot; a member carried by the other section of said stem and slidable in said slot; and means connected with the first mentioned section of the stem for swinging the same upon its pivot, to break the joint between said sections and rock the body of the cross head for simultaneously shifting either pulley toward and the other pulley from the centers of the adjacent disks.

10. The combination, with a frame provided with a slotted beam disposed longitudinally thereof, a pair of parallel driving shafts carried by the frame, and a friction disk secured to one end of each shaft, of a pair of alining driven shafts carried by the frame and disposed at right angles to the driving shafts; a friction pulley slidable upon each driven shaft and arranged in contact with the adjacent disk; a cross head mounted upon said beam and provided with a member projecting into the slot formed in the latter, said cross head being connected at its opposite ends with the adjacent pulleys; and means connected with said member for moving the cross head backward or forward, to simultaneously shift both pulleys toward or from the centers of the adjacent disks.

11. The combination, with a frame provided with a slotted beam disposed longitudinally thereof, a pair of parallel driving shafts carried by the frame, and a friction disk secured to one end of each shaft, of a pair of alining driven shafts carried by the frame and disposed at right angles to the driving shafts; a friction pulley slidable upon each driven shaft; a cross head mounted upon said beam and provided with a depending member extending into said slot, said cross head including a jointed stem;

means connected with said member, for bodily moving the cross head forward or backward to simultaneously shift both pulleys toward or from the centers of the adjacent disks; and separate means connected with one of the sections of the stem of the cross head, for breaking the joint between said sections, to rock the body of the cross head and simultaneously shift either pulley toward and the other pulley from the centers of the adjacent disks.

12. The combination, with a frame having a slotted beam disposed longitudinally thereof, a pair of parallel driving shafts carried by the frame, and a friction disk secured to one end of each shaft, of a pair of alining driven shafts carried by the frame and arranged at right angles to the driving shafts; a friction pulley slidable upon each driven shaft and arranged in contact with the adjacent disk; a cross head mounted upon said beam and provided with a depending member extending into said slot, said cross head having its ends connected with the adjacent pulleys, and including a jointed stem, one section of the stem being pivoted to the frame and provided with a longitudinal slot and the other section of the stem having a member extending into the slot in the first-mentioned section; means connected with said depending member, for moving the cross head bodily forward or backward, to simultaneously shift both pulleys toward or from the centers of the adjacent disks; and separate means connected with the first mentioned section of said stem, for swinging said section upon its pivot, to break the joint between said sections and rock the cross head, to simultaneously shift either pulley toward and the other pulley from the centers of the adjacent disks.

13. The combination, with a pair of parallel driving shafts and a friction disk secured to one end of each shaft, of a pair of driven shafts disposed at right angles to the driving shafts; a friction pulley slidable upon each driven shaft and arranged in contact with the adjacent disk; a movable member operatively connected with said pulleys; and separate actuating devices connected with said member for simultaneously shifting both pulleys toward or from the centers of the adjacent disks, to vary the speed of rotation of the driven shafts, and for simultaneously imparting an endwise movement to said driving shafts, to bring said disks into and out of frictional engagement with said pulleys.

14. The combination with an opposed motor having a pair of parellel tubular shafts, of a pair of driving shafts having their rear ends fitting in said tubular shafts; a friction disk secured to the front end of each driving shaft; a pair of driven shafts disposed at right angles to the driving shafts; a friction pulley carried by each driven shaft and arranged for contact with the adjacent disk; and means for simultaneously imparting an endwise movement in either direction to said driving shafts, to bring said pulleys into and out of frictional engagement with said disks.

15. The combination with an opposed motor having a pair of tubular shafts, of a pair of driving shafts having their rear ends fitting in said tubular shafts; a friction disk secured to the front end of each driving shaft; a pair of driven shafts disposed at right angles to the driving shafts; a friction pulley carried by each driven shaft and arranged for contact with the adjacent disk; a lever disposed transversely of said driving shafts; a member pivoted to said lever and engaged at its ends with said driving shafts; and means for swinging said lever in either direction, to impart a simultaneous endwise movement to said driving shafts, to bring said disks into and out of frictional engagement with said pulleys.

16. The combination, with an opposed motor having a pair of tubular shafts, of a pair of driving shafts having their rear ends fitting in said tubular shafts and provided with a pair of spaced collars; a friction disk secured to the front end of each driving shaft; a pair of driven shafts disposed at right angles to the driving shafts; a friction pulley carried by each driven shaft and arranged for contact with the adjacent disk; a transversely-disposed lever; a centrally-pivoted member carried by said lever and provided at each end with an eye through which the adjacent driving shaft extends, said eyes fitting between said pairs of collars; and means for swinging said lever in either direction for imparting a simultaneous endwise movement to said driving shafts, to bring said disks into and out of frictional engagement with said pulleys.

17. The combination, with a pair of parallel driving shafts and a friction disk secured to one end of each shaft, of a pair of driven shafts disposed at right angles to the driving shafts; a friction pulley carried by each driven shaft and arranged for contact with the adjacent disk; a lever disposed transversely of said driving shafts; a centrally-pivoted member carried by said lever and engaged at its opposite ends with said driving shafts; and means for swinging said lever in either direction, for imparting a simultaneous endwise movement to said driving shafts, to bring said disks into and out of frictional engagement with said pulleys.

18. The combination, with a pair of parallel driving shafts, and a friction disk secured to one end of each shaft, of a pair of driven shafts disposed at right angles to the driving shafts; a friction pulley slidable upon each driven shaft and arranged for contact with the adjacent disk; means for simultaneously shifting both pulleys toward or from the centers of the adjacent disks, to vary the speed of rotation of said driven shafts; a lever disposed transversely of said driving shafts; a centrally-pivoted member carried by said lever and engaged at its opposite ends with said driving shafts; and means for swinging said lever in either direction, for imparting a simultaneous endwise movement to said driving shafts, to bring said disks into and out of frictional engagement with said pulleys.

In testimony whereof, I affix my signature, in presence of two witnesses.

O PETER GRAU.

Witnesses:
  JAMES KELLEY,
  JAMES KELLEY, Jr.